United States Patent

Hinson et al.

[11] Patent Number: 6,144,391
[45] Date of Patent: *Nov. 7, 2000

[54] ELECTRONIC VIDEO PROCESSING SYSTEM

[75] Inventors: Neil Roy Hinson, Newbury; Timothy John Beckwith, Calcot Reading; George William Catlow, Newbury; Ian Malcolm Stewart, Newbury; Colin John Wrey, Newbury, all of United Kingdom

[73] Assignee: Quantel Limited, Newbury, United Kingdom

[*] Notice: This patent is subject to a terminal disclaimer.

[21] Appl. No.: 09/032,108

[22] Filed: Feb. 27, 1998

Related U.S. Application Data

[63] Continuation of application No. 08/467,755, Jun. 6, 1995, Pat. No. 5,808,628.

[51] Int. Cl.[7] .................................................. G06T 1/60
[52] U.S. Cl. .......................... 345/507; 345/113; 345/114; 345/115; 345/508; 345/509; 345/511; 348/584; 348/585; 348/586
[58] Field of Search .................................. 345/113, 114, 345/115, 116, 173, 179, 507, 508, 509, 511, 512; 348/584, 585, 586, 588

[56] References Cited

U.S. PATENT DOCUMENTS

| | | | |
|---|---|---|---|
| 4,514,818 | 4/1985 | Walker | 345/429 |
| 4,602,286 | 7/1986 | Kellar et al. | 348/597 |
| 4,667,221 | 5/1987 | Cawley et al. | 348/587 |
| 4,688,106 | 8/1987 | Keller et al. | 386/122 |
| 5,077,610 | 12/1991 | Searby et al. | 348/593 |
| 5,107,252 | 4/1992 | Trayner et al. | 345/139 |
| 5,142,616 | 8/1992 | Kellas et al. | 345/435 |
| 5,175,622 | 12/1992 | Inoue et al. | 348/584 |
| 5,175,625 | 12/1992 | Miles | 348/563 |
| 5,212,544 | 5/1993 | Kellar et al. | 348/590 |
| 5,237,648 | 8/1993 | Mills et al. | 345/433 |
| 5,283,560 | 2/1994 | Barlett | 345/113 |
| 5,592,649 | 1/1997 | Kimura et al. | 395/481 |
| 5,808,628 | 9/1998 | Hinson et al. | 345/507 |
| 5,929,933 | 7/1999 | Takeuchi | 348/581 |

FOREIGN PATENT DOCUMENTS

| | | |
|---|---|---|
| 0171829 | 2/1986 | European Pat. Off. . |
| 0396415 | 11/1990 | European Pat. Off. . |
| 2156627 | 10/1985 | United Kingdom . |
| 2179819 | 3/1987 | United Kingdom . |
| 2248362 | 4/1992 | United Kingdom . |

*Primary Examiner*—William A. Cuchlinski, Jr.
*Assistant Examiner*—Marthe Y. Marc-Coleman
*Attorney, Agent, or Firm*—Cooper & Dunham LLP

[57] ABSTRACT

The system comprises a store 11 having several disc drives for storing multiple video frames in random access order. The store 11 also has at least two ports 15, 16 each capable of transferring data relating to a respective video clip at video rate. The system further comprises processors 27, 28 for processing frame data associated with at least two video clips and a monitor for displaying selected ones of said multiple video frames. In a preview mode of operation video clips can be read from the store 11, combined and displayed on the monitor at video rate, and changes can be made to the clips and the manner in which they are combined without committing the combination to the store.

20 Claims, 4 Drawing Sheets

ELECTRONIC VIDEO PROCESSING SYSTEM

This application is a continuation of application Ser. No. 08/467,755 filed Jun. 6, 1995, now U.S. Pat. No. 5,808,628, issued Sep. 15, 1998.

FIELD OF THE INVENTION

The invention relates to an electronic video processing system. The invention also relates to an electronic video store.

BACKGROUND OF THE INVENTION

A video graphics system is described in British Patent No. 2,089,625 and corresponding U.S. Pat. No. 4,514,818, the teachings of which are incorporated herein by reference. This system includes a touch tablet and stylus combination for generating position signals designating the position of the stylus relative to the touch tablet. The user or operative paints or draws (hereinafter referred to simply as "paints") by selecting a colour and a so called brush distribution from a range of predefined colours and distribution functions. Movement of the stylus relative to the touch tablet causes the generation of a series of position signals.

In equipment according to our British patent no. 2,089,625, as currently manufactured and sold by the Assignee of this application, additional means are provided which allow the system to be configured to perform picture composition in addition to painting. Some configurations which allow composition are described in British patent no. 2,113,950 and in corresponding U.S. Pat. No. 4,602,286 the teachings of which are also incorporated herein by reference. In such configuration, a store is provided having the capacity to store two independent pictures, termed herein as the foreground image and the background image respectively, and a further image which is termed the control image or stencil. The control image, like the foreground and background images, can be created by the artist, using the system in a painting mode. The control image usually comprises areas of pixels having a maximum value which represents opacity and a minimum value which represents transparency and is created so that in effect it masks a selected part of the foreground image while exposing the remainder. The control image is defined by eight bits and during creation can be displayed as a single colour superimposed on the foreground picture. The pixels of the foreground image and the control image are read in parallel from the respective parts of the store and applied to a linear interpolating circuit, which is rendered operational during an image preview mode and during an image composition mode. The pixels in the background image are also read to the interpolating circuit concomitantly with the reading of the foreground image pixels and the control image pixels.

A manipulator under stylus control or the control of other user operable means, changes the order of reading the foreground pixels and control pixels relative to the background pixels so as to effect a spatial transformation of the foreground and stencil relative to the background. Whilst the system is in preview mode, the artist can manipulate the stylus to effect a series of desired transformations such as zoom, pan, scroll, rotate, and change perspective. During a frame period the foreground image pixels in transformed order and the background image pixels are applied to an image input of the interpolating circuit whilst the control image is applied to a control input thereof to act as a pixel-by-pixel interpolating coefficient. The output of the interpolating circuit is applied to the picture monitor and displayed, but without affecting any of the pictures as stored. The interpolation is of the form KB+(1−K)F, where K is an interpolation constant defined by the control image, B is the background picture data and F is the foreground picture data. The interpolation has the effect of causing the display to represent the foreground image where the control image data K=0, and to represent the background image where the control image data K=1, and to represent a combination foreground and background where K has a value between 0 and 1, thereby simulating the pasting or overlaying of the part in the foreground image on the background. Using the stylus to vary the spatial transformation, the artist can try various positions of the insert onto the background image from the foreground image until he perceives a desired transformation. Thereupon the artist, by producing a predetermined "stick" command, switches the system to the composition mode. The foreground image pixels and background image pixels are then read to the interpolating circuit and combined by interpolation under control of the control image pixels, the foreground image and control image pixels being read in the transformation order prescribed in the last try during the preview mode. The thus combined pixels are then written back to the store replacing the pixels previously stored therein.

The features and facilities provided by the above discussed systems can be applied to television post production in the form of an editing system in which a first or foreground video clip is inserted into a second background video clip. Such editing systems nowadays have the ability to capture and retouch a frame of live video, thereby enabling dynamic graphics to be produced.

Figure 1:
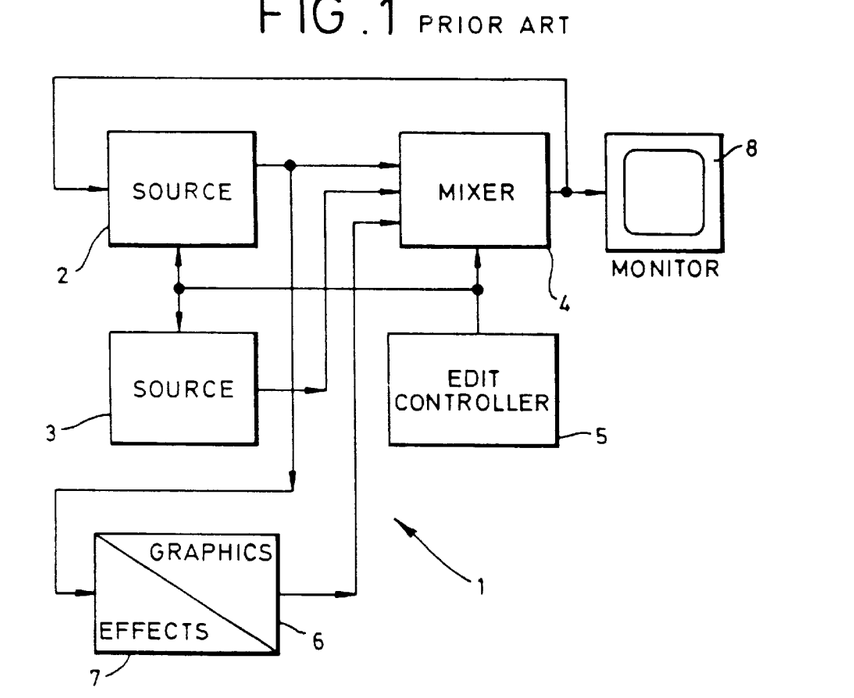
FIG. 1 is a schematic diagram of a prior art system as already described hereinabove.

Hitherto known editing systems vary from manufacturer to manufacturer but generally comprise the features shown in FIG. 1 of the accompanying drawings. As shown in FIG. 1 of the accompanying drawings a known editing system 1 comprises two sources 2 and 3, which may for example be video tape recorders (VTRs), whose outputs are connected to a vision mixer 4 which together with the two sources 2 and 3 are controlled by an edit controller 5. The system 1 further comprises a graphics unit 6 such as the abovementioned system disclosed in the British patent 2,089,625 and an effects unit 7 by which spatial transformations, such as those disclosed in the abovementioned British Patent 2,113,950, may be applied to video from one or both of the sources 2 and 3.

The system 1 can be used to apply graphics and effects to video from one of the sources, for example the source 2. In this mode of operation, a video clip is output a frame at a time from the source 2 to the effects/graphics unit 6, 7 where desired modifications are effected by the user to the frame. Once the frame has been modified it is transferred back to the source 2 and the next frame in the clip is output to the unit 6, 7. During modification the frame is output for display on a monitor 8 so that the user can see the result of his modifications as they are made to the frame.

The system 1 can also be used to combine video clips from the two sources 2 and 3, which clips may be modified as described hereinabove prior to being combined. One way in which the clips may be combined is simply to join or splice one clip to the end of the other or to splice one clip or a portion of that clip into a location between frames of the other clip. In this mode of operation the edit controller 5 is made responsive to an edit decision list which identifies the location of each clip in the two sources by for example its start frame and end frame, the number of frames in the clip and where appropriate the frames between which a splice is to be made. A more sophisticated operation which may also be performed by the system 1 is that of combining two clips by dissolving between the two clips. In a dissolving operation the edit decision list includes data identifying the number of frames in a dissolve. In response thereto the edit controller 5 controls the mixer 4 to combine corresponding frames in the two clips, for example in a weighted summing of the frame data. During this mode of operation frames from the source 2 may be modified by the effects unit 7 before being passed to the vision mixer 4.

In all of the above discussed modes of operation the resulting video output from the mixer 4 may simply be displayed on the monitor 8 or it may be stored to enable further work to be carried out subsequently. In the case where it is stored for subsequent work a further VTR (not shown) will be required to record the video output. A further VTR is necessary since both of the source VTRs 2, 3 will be engaged in playing out the two video clips and therefore will not be available for storing new frames as they are created.

The abovedescribed system 1 therefore may include a third VTR (not shown) which is used to record the combined clip output from the mixer 4. Such a system is known as a three machine edit suite, since it comprises three VTRs. A further VTR may be added to the system as a third source (not shown) to form a so-called four machine edit suite. During editing the third source is sued to supply a moving black and white key, known as a "matte reel". The key is related to the image in a clip supplied by one of the sources 2, 3 and is used in the mixer 4 to key that clip over the video supplied by the other of the sources 2, 3. Frames from the matte reel may be passed together with corresponding frames from the clip of the source to which it is related to the effects unit for combination with respective frames from the other source by the vision mixer 4.

One drawback with the abovedescribed three and four machine edit suites is that often more than one operation is required to produce a desired result and this restricts artistic use of the system. Furthermore, it is impossible to create graphics dynamically, ie as the video clips are run and this prevents subtle integration of the graphics with the video resulting in a discernable difference between the live video and the off-line graphics. As a result, it is difficult to create first time around exactly what was intended and the creation process is therefore one of repeatedly working and reworking a piece until the desired result is achieved.

Another drawback is related to the use of VTRs to supply and record video clips. VTRs are sequential access devices and cannot simultaneously playback and record different video clips. This means that a separate VTR is required as a source for each video clip to be worked on and at least one further VTR is required to record the video output from the mixer.

The proprietors of the abovementioned British and US patents manufacture and sell an editing system under the trade mark "HARRY". In the HARRY system frames forming a video clip are digitally encoded and stored in disk stores. As is disclosed in U.S. Pat. No. 4,688,106, the teachings of which are incorporated herein by reference, the video clips are read out of the disc stores in parallel. Whilst this arrangement provides greater flexibility by effectively allowing random access to the frames that constitute a clip, it nevertheless requires separate disc stores for each of the video clips.

SUMMARY OF THE INVENTION

The present invention in one of its aspects aims to overcome the above and associated problems by providing an electronic video store comprising storing means for storing digital data representing multiple video frames and access means for providing random access input and output of video frames to and from the storing means and including at least two ports connected to the storing means and each capable of transferring data to or from the storing means relating to a respective video frame at video rate.

Since the access means enables random access to the stored video frames, one port might for example be used to read frames relating to one clip from the store whilst the other port is used simultaneously to read frames relating to a second clip from the store, thereby enabling simultaneous real-time processing and display of the two clips by the system.

The combination of a random access store together with at least two input/output ports provides for a system of far greater flexibility than has hitherto been possible.

In the practice of the invention each of the ports has sufficient bandwidth to enable at least one clip to be transmitted at video rate. Since there are at least two ports it is therefore possible to convey simultaneously frames relating to at least two video clips from the store for concurrent processing and/or display of the images represented thereby. Thus, the two ports enable a dissolve between two video clips to be made as the data is required, without the need to store the dissolve clip during its creation. This facilitates editing by allowing a dissolve to be previewed before the data therefor is committed to memory.

In another aspect the invention provides an electronic video processing system for combining a plurality video clips, the system comprising storing means for storing a multiplicity of video frames and access means for providing random access transfer to and from the storing means of said video frames comprising said plural video clips and including at least two ports connected to the storing means and each capable of transferring data to or from the storing means at video rate, the system further comprising a processor responsive to user operable input means for processing data from the storing means representing user selected frames of said two video clips to produce a combined video clip, and a monitor for simultaneously displaying at least some of said multiplicity video frames.

With the intention of facilitating editing the present invention aims to provide for greater interaction with the user by enabling several of functions to be selected simply by movement of a cursor on the display and manipulation of a stylus on a touch tablet.

The invention also extends to a video processing apparatus comprising: storing means for storing data representing at least one initial video clip comprising a multiplicity of initial video frames and corresponding initial control image, the data for each stored frame including identifying data which enables the frame to be uniquely identified; a frame store for storing data representing at least one video frame and corresponding control image; user operable input means; and a processor responsive to the user operable input means, the processor comprising selecting means for selecting at least one initial video frame and corresponding initial control image to be processed and for writing data representing the selected at least one video frame and corresponding control image to the frame store, means for processing control image data in the frame store to produce data representing a modified control image and for producing further identifying data which enables the modified control image to be uniquely identified and indicates that the modified control image is associated with the selected at least one initial video frame and corresponding control image, and writing means for writing the thus produced modified control image data to the storing means for storage therein in association with the selected at least one initial video frame and corresponding control image.

The invention also covers a method of video processing, the method comprising: storing data in a store, the stored data representing an initial video clip comprising a multiplicity of initial video frames and corresponding initial control images and including identifying data which enables each frame to be uniquely identified; selecting at least one initial video frame and corresponding initial control image to be processed and writing the data for the selected at least one video frame and corresponding control image to a frame store; processing the control image data to produce data representing a modified control image; producing further identifying data which enables the modified control image to be uniquely identified and indicates that the modified control image is associated with the selected at least one initial video frame and corresponding control image; and writing the thus produced modified control image data to the store for storage therein in associated with the selected at least one initial video frame and corresponding control image.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION

Figure 2:
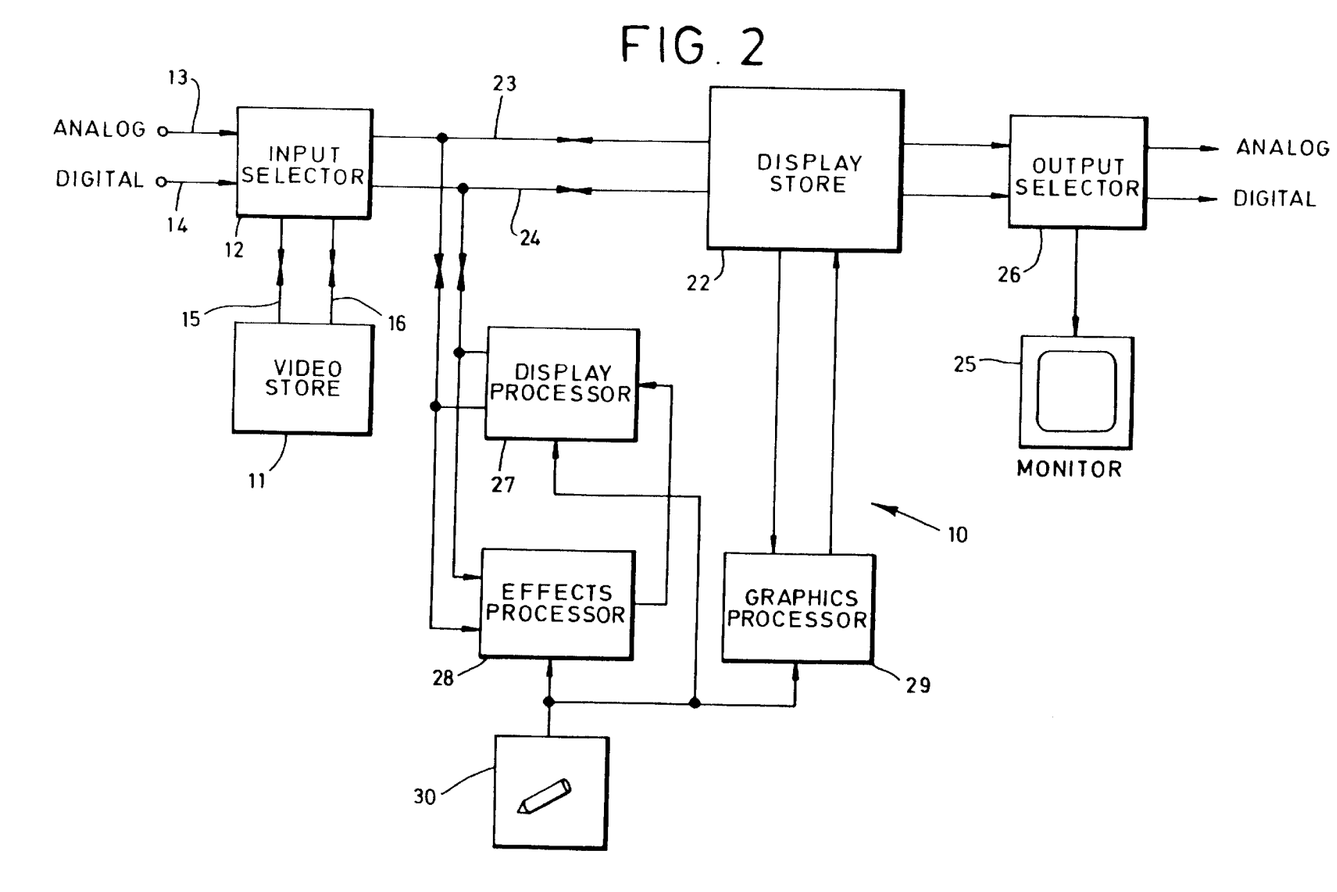
FIG. 2 is a schematic diagram of a system embodying the invention.

Referring now to FIG. 2 of the accompanying drawings there is shown an electronic video processing system 10 in which video clip data is stored in a video store 11. The video data is input to the video store 11 via an input selector 12 which includes both an analog input 13 and a digital input 14 to enable data to be input in either analog or digital format from an off-line bulk storage device or library (not shown) such as a VTR. The video clip data is stored in digital form in the video store 11 and the input selector therefore comprises a suitable converter for converting the incoming chip data into the required format. The input selector 12 is connected to the video store 11 via two bidirectional data ports comprising paths 15, 16 each capable of conveying a full frame of data at least video rate to and from the video store 11.

Figure 3:
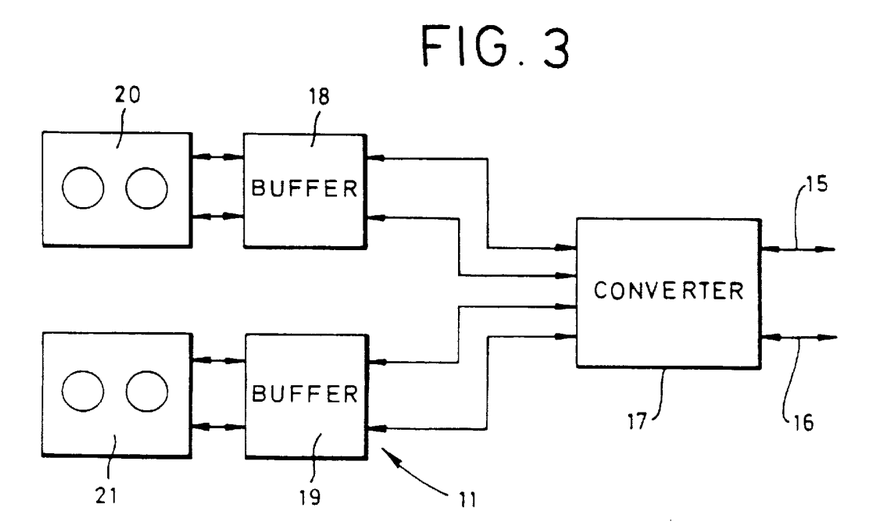
FIG. 3 is a schematic diagram of a video store.

The video store 11 is shown in greater detail in FIG. 3 of the accompanying drawings as comprising a converter 17 which interfaces the two bidirectional paths 15, 16 via two buffers 18, 19 to at least two disc packs 20, 21. Each disc pack comprises, for example two Fujitsu 2380 disc drive devices in parallel. Each pack 20, 21 requires two disc drives in order to achieve the necessary bandwidth since each disc is only able to receive or output data at approximately half broadcast standard video rate. For each port 15, 16 to be able to convey data at broadcast standard the paths each require a bandwidth of approximately 21 M bytes per second. Each Fujitsu disc drive has a bandwidth of approximately 16 M bytes per second. The four disc drives therefore have more bandwidth capacity than is actually required. This extra capacity provides time for the discs to locate data for the next frame to be output during the next frame period or to locate an area for storing the next frame during the next frame period. Thus by providing two disc drives in parallel each disc pack 20, 21 is able to receive or output data at full broadcast standard video rate (ie 25 or 30 frame per second) and the video store 11 is therefore able to output in a frame period or store all the data for two full frames of video.

The buffers 18, 19 cooperate with the converter 17 to distribute data from the two bidirectional paths 15, 16 to the disc packs 20, 21 when data is being written to the video store 11, and to combine data from the disc packs 20, 21 to the bidirectional paths 15, 16 when data is being read from the video store. For example, when two frames of data are read simultaneously from the store 11, the data relating to the two frames is read in one frame period from the disc packs 20, 21 via the buffers 18, 19 to the converter 17 where the data is reformed as two separate frames which are output separately, one on each line 15, 16 during the next frame period. Similarly, two incoming frames of data received by the converter 17 from paths 15 and 16 in one frame period are distributed via the buffers 18, 19 to the disc drives in the disc packs 20, 21 during the next frame period. Therefore, in each frame period a frame of data is output from or stored in the disc packs via each of the ports 15, 16.

In order to facilitate the random access transfer of frame data between the store 11 and the rest of the system 10, the converter 17 and/or each buffer 18, 19 includes a large cache store (not shown) for accumulating several frames of data. This minimises the amount of head seeking by the disc drives and applies equally to both the reading and writing of data.

The frame data may be distributed among the disc drives in any convenient order. For example one field of the frame may be delivered to buffer 18 and from there the chrominance of the field written to one disc drive in the pack 20 and the luminance of the field written to the other disc drive in the same pack 20. The other field of the frame would be delivered to the other disc pack 21 for storage therein in a similar manner. Thus, the elements of each frame are distributed among the four disc drives of the two disc packs 20, 21.

It will be appreciated from the foregoing that the video store is a truly random access frame store which thereby enables frames from different video clips to be accessed in a random order for output therefrom. The provision of two bidirectional paths 15, 16 enables two frames of data to be simultaneously written to or read from the store 11 or for one frame to be written to while another is read from the store 11. This enables a system 10 of greater flexibility to be produced than has hitherto been possible.

Returning to FIG. 2, the system 10 further comprises a display store 22 which is connected via two bidirectional busses 23, 24 to the input selector 12. The display store 22 comprises a large scratch pad store for storing data relating to several frames of video and a display processor for processing the frame data therein to produce respective frames of reduced size for concurrent display at different portions of a monitor 25, as will be described in greater detail hereinafter. The store is able to output one piece of stored video simultaneously to several different places on the monitor. The display processor comprises two separate processing units for producing simultaneously images of reduced size from data supplied via the two bidirectional busses 23, 24. A video clip may be read out from the video store 11 and written directly to the display store 22 at video rate for display on the monitor 25 either at full size or at half or quarter size. Alternatively video clips may be transferred from a bulk storage library (not shown) via the input selector 12 to the display store 22. Data from the display store 22 is read by an output selector 26 and output to the monitor 25 for display. This enables the user to preview one or more video clips or to identify video clips stored off-line in a bulk store library (not shown) for transfer to the video store 11. The output selector 26 also comprises both analog and digital outputs 26a, 26b, similar to the analog and digital inputs 13, 14 of the input selector 12, to enable video clip data to be output in either analog or digital format to the bulk storage device for example.

In an editing mode of operation data relating to a plurality of video clips is read out from the video store 11 a frame at a time to the video store 22 where the data is processed before being stored so as to enable several frames to be displayed simultaneously at different, overlapping, or shared, portions of the monitor 25, as will be described in greater detail hereinafter. The processed data is output from the display store in raster order for display on the monitor 25. The video store has associated with it a video processor 27 and an effects processor 28. The video processor 27 is arranged to perform such operations as generating a keying signal, modifying colour, changing texture, and the effects processor 28 generates spatial effects such as changes of size, position and spin to one or more frames of a video clip, which operations and effects are all per se well known. Frames modified by the video processor 27 and effects processor 28 are supplied or returned to the display store 22 for display on the monitor 25.

Preferably the parameters controlling the operations executed by the video processor 27 and the effects processor 28 are variable from frame to frame. So-called key frames may be defined by the user and parameters for frames between key frames derived by interpolation. Alternatively the parameters controlling the operations of the video processor 27 can be fixed so that only parameters controlling the spin, position, size, etc operations of the effects processor 28 are variable. The use of key frames to define selected parameters is per se well known and is disclosed for example in British Patent Application published as No. 2,223,910, the teachings of which are incorporated herein by reference.

The display store 22 also has associated with it a graphics processor 29 which enables a user to paint into each frame as described in the abovementioned British Patent No. 2,089,625, and/or to create a key or stencil as described in the abovementioned British Patent No. 2,113,950. The graphics processor 29 is responsive to a user operable input device such as a stylus and touch table combination 30, as indeed are the video processor 27 and the effects processor 28.

Figure 4:
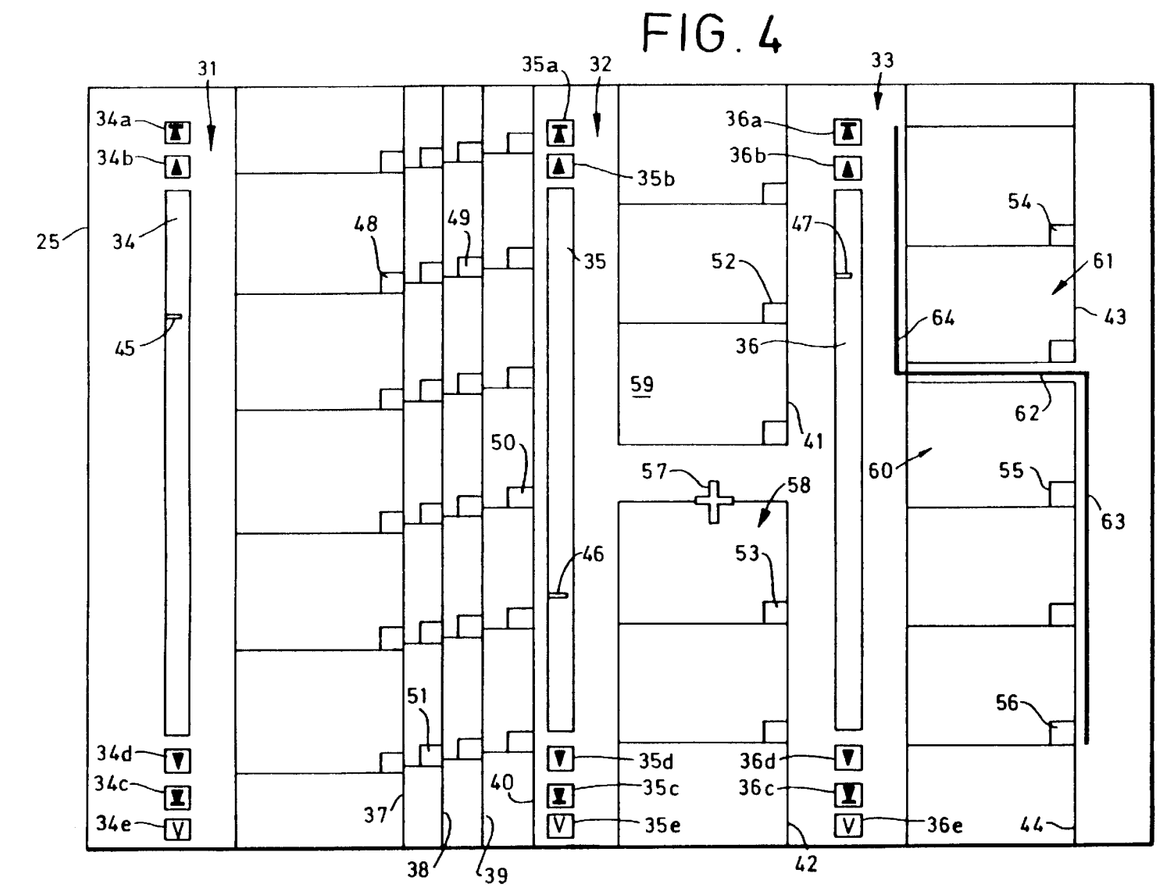
FIG. 4 is an exemplary display of video frames generated by the system of FIG. 2.

During editing the video processor in the display store 22 is arranged to generate from the input video clips a display that represents an editing environment such as the display shown in FIG. 4 of the accompanying drawings. As shown in FIG. 4 of the drawings, the display is divided into three distinct working areas 31, 32, 33 by three so-called reel bars 34, 35, 36. Each working area 31, 32, 33 has displayed in it a small number of frames relating to one or more reels or video clips 37 to 44. Of course more than three working areas could be displayed if so desired. A high definition television monitor for example has a wider aspect ratio (16×9) than normal broadcast television (4×3) and would be well suited to the display of four or even five reels.

Each reel bar 34 to 36 includes a marker 45 to 47 which moves along the reel bar to provide an indication of the position of the displayed frames in relation to the clip as a whole and each displayed frame includes at its bottom right hand corner an information box, for example 48 to 56, to provide a further indication of the positions of the displayed frames in the video clips. The information in each box may for example be the number, ie position, of the frame in the clip or it may be time codes generated by a VTR when the frames were originally recorded. Each video clip can be worked on independently in each working area 31, 32, 33 and can be moved into another of the working areas to be combined with another video clip displayed therein, by movement of the stylus on the touch tablet as represented by a cursor 57 displayed on the monitor 8 as will be described in greater detail hereinafter.

The cursor 57 is used to control many operations performed by the system 10. One function which the cursor 57 can be used to control is that of selecting which frames from a selected clip are displayed in the working areas 31 to 33. The reel bars 34 to 36 each have associated direction control icons 34a to e, 35a to e and 36a, to e. The reel bars, the control icons and the cursor are all generated by the processor within the display store 22. Placing the cursor 57 over the icon 36a for example and pressing the stylus firmly on the touch tablet will cause the clip displayed in work area 33 to scroll up whilst selecting icon 36b will cause the clip to scroll up rapidly to an event, such as a join, previously defined in the clip. Similar operations are performed by selection of the other icons as will be readily apparent to those possessed of the appropriate skills. When a scrolling icon is selected data relating to the appropriate video frames in the appropriate clip are read from the video store 11 to the processor of the video store 22 from which it is output for display. The data is processed to reduce the size of each frame and the processed data is then stored at locations in the store 22 corresponding to the position of the reduced frame on the monitor 25.

Video clips to be edited are loaded from the bulk store (not shown) via the input selector 12 to the video store 11. One of the bidirectional ports eg 15 is used to transfer the incoming video clip data to the video store 11 and this leaves the other path eg 16 free to transfer data relating to another video clip, for example a moving key associated with the first mentioned video clip. During the loading of clip data in the store 11 the data is read simultaneously by the display store 22 for display of the video on the monitor. Indeed, the video of both clips can be displayed at the same time either as two half size images duly processed by the display store 22 on the monitor 25 or as full size images using two monitors. Selected frames of selected clips stored in the video store 11 can then be transferred to the video processor 27 and effects processor 28 for processing and to the display store 22 for display on the monitor 25. Since the video store 22 is effectively a random access frame store, the system can be made to display any frame from any clip or combination of frames and clips in any order and at any position on the monitor 25 without the need for the user to commit irretrievably to a particular displayed combination until such time as he is entirely happy with the result as displayed on the monitor.

Once the desired clip or clips have been loaded into the video store 11 and selected frames therein displayed on the monitor 25 the user can edit the clips. Cut and insert editing, ie video splicing, is achieved for example by displaying frames of a first video clip to be inserted in say the working area 32, and frames of a second video clip, to be cut to receive the first clip, in the working area 33. The start of the first clip is identified by placing the cursor 57 between the first frame (for example frame 58 in FIG. 4) and its preceding frame and pressing the stylus down firmly on the touch tablet and thereafter moving the cursor rapidly horizontally to the right by corresponding rapid manipulation of the stylus on the touch tablet. This action is a cutting action known as swiping and is interpreted by the processor 27 as a command to cut the first video clip at the join between frame 58 and the preceding frame (indicated at 59 in FIG. 4) to form an insert video clip (indicated at 42 in FIG. 4).

The image of the insert clip 42 can be attached to the cursor 57 by placing the cursor over the first frame 58 and pressing the stylus down on the touch tablet. Thereafter two dimensional movement of the cursor 57 on the monitor display results in corresponding movement of the insert video clip 42 on the display.

The user is therefore free to move the insert video clip 42 anywhere on the display screen and can for example move the insert clip 42 into the working area 33 and position the first frame 58 thereof over a frame 60 of the second video clip displayed therein. With the insert clip 42 so positioned, pressing the stylus down firmly on the touch tablet is interpreted by the processor 27 as a command to cut the second video clip at the join between frame 60 and the preceding frame (61 in FIG. 4), and to join the insert clip 42 onto the end of the second clip after the frame 61 thereof.

Once this operation has been performed by the processor a new clip is defined as a spliced combination of the frames of the second clip up to and including frame 61 followed by all frames after and including frame 58 of the first clip. A similar operation can be used to move a clip from one reel to another. If instead of placing the first frame 58 of the first clip over the frame 60 of the second clip, the first frame 58 is instead placed over the join between the frames 60 and 61 of the second clip, then the whole of the first clip will be placed between frames 60 and 61 of the second clip.

Since the cut and insert operation is performed in the video processor 27 it therefore does not result in a corresponding change in the frame data in the video store 11. Accordingly, data defining frame 59 and the frames connected thereto in the first clip and data defining frame 60 and frames connected thereto in the second clip remain available for further processing if required. This availability of frames is indicated on the display by a continuous line 62 which crosses the combined clip at the join between the first and second clips and connects between a pair of tails 63, 64 running parallel to the displayed clip. The length of each tail 63, 64 represents the number of available frames in the respective first or second clip. Thus the tail 64 indicates that the first two frames of the first clip do not form part of the combined clip and are available for further processing if required, and the tail 63 indicates that the last three frames of the second clip do not form part of the combined clip and are available for further processing if required.

Making frames available for further processing can be useful if the operator is not happy with the result obtained in the combined clip during preview when the clip is run and displayed as a video sequence. In order to facilitate user changes to the combined clip by changing the position of the join in the combined clip, the processor 27 is made responsive to manipulation of the stylus and corresponding movement of the cursor 57 in the area of the join as represented by the cross bar 62. When the cursor is placed over the cross bar 62 and the stylus is pressed down firmly on the touch tablet, subsequent upward movement of the cursor 57 on the display screen causes the processor to insert in reverse order frames from the first clip and to remove in reverse order frames from the second clip. Thus, in FIG. 4 upward movement of the cursor would cause frame 61 of the second clip to be replaced by frame 59 of the first clip. The length of tail 64 would decrease accordingly by one frame and the length of tail 63 would increase accordingly by one frame. Similar downward movement of the cursor 57 would result in the opposite change in frames occurring. Furthermore, hidden frames (ie frames represented by the tails 63, 64) in either clip can be displayed by placing the cursor 57 on the tail 63, 64 and swiping upwards along the tail. The frames thus revealed can be hidden again by placing the cursor 57 on the tail and swiping downwards along the tail.

The system is also arranged to facilitate replication of a clip or a portion of a clip. The clip or clip portion to be replicated is identified by placing the cursor over the first frame thereof, pressing the stylus down firmly on the touch tablet in order to connect the clip to the cursor and then pressing down again with the stylus to disconnect the cursor from the clip. The display store 22 responds to this manipulation by replicating the identified frames in the store. The copy clip thus created is not displayed separately on the monitor but is conceptually held or displayed off-screen. The system is therefore arranged to enable the copy clip to be retrieved by swiping the cursor off one side of the screen. This causes the copy clip to be attached to the cursor and the copy can then be positioned as desired on the screen.

In addition to splicing two clips together, as discussed hereinabove, the system 10 is able to dissolve between two clips over a selected number of frames. In a procedure similar to that already discussed hereinabove the first and last frames of two video clips are identified and the two clips are spliced together in one of the working areas 31 to 33. A dissolve is then set over a selected number of frames, by placing the cursor 57 over the cross bar 62 at the join between the tip clips and pressing down with the stylus. The system interprets this action as a command to create a dissolve. The command is acknowledged by the crossbar 62 being displayed in a different colour. A menu is displayed on the monitor thereby enabling the user to enter data about the dissolve including its length and whether the dissolve starts at splice point as represented by the crossbar 62, finishes at the splice point, or includes the splice point. Hidden frames that contribute to the dissolve are represented by respective portions of the tails 63, 64 being displayed in a further different colour. Again, there is no actual change in the data stored in the video store 11 at this stage and the user is free to change the position of the join between the two clips as described hereinabove.

In some situations the user may wish to use only some of the hidden frames in the two clips, as represented by the tails 63, 64, in a dissolve operation. For example, the user may wish to splice the first and second slips together such that the first clip has say ten hidden frames after the splice and the second clip has say six hidden frames before the splice. The user may then decide to dissolve between the two clips over say ten frames centred on the splice. As such the dissolve five of the hidden frames from each of the clips. Hidden frames used in the dissolve are indicated by the appropriate portions of the tails 63, 64 being displayed in the colour for a dissolve, for example magenta, and hidden frames not used in the dissolve are indicated by the appropriate portions of the tails 63, 64 being displayed in the colour for a splice, for example yellow. Thus, in the above example the last five hidden frames in the first clip would be represented by a magenta tail portion and the other five frames would be represented by a yellow tail portion. Similarly, the first hidden frame of the second clip would be represented by the display of a yellow tail portion and the other five hidden frames would be represented by a magenta tail portion.

Once a dissolve has been defined on the display screen, it can be previewed by running the combined clip containing the dissolve at video rate. A further control icon 34e to 36e is displayed beneath respective reel bars 34 to 36 and enables the user to enter the preview mode. When the viewing control icon 34e to 36e is selected by use of the cursor the system responds by displaying at full size on the monitor the frame displayed nearest to the centre of the working space when the viewing icon was selected. A menu of functions (such as play, fast, forward, fast reverse, stop, etc.) is also displayed on the monitor and the selected clip can be previewed by the use of selection of the desired functions with the cursor. In this preview mode of operation frames comprising the first clip are read in order from one path e.g. 15 of the video store 11 and passed via the video processor 27 to the display store 22 for display on the monitor 25. During the dissolve frames comprising the second clip are simultaneously read in order from the video store 11 via the other path 16 and are passed together with respective frames from the first clip to the processor 27. Respective frames from the first and second clip are combined in a weighted combination by the video processor 27 and the resulting combined frames are passed in order to the display store 22 for display of the combined image on the monitor 25.

The above discussed previewing of a dissolve is made possible by the provision of a video store 11 with two bidirectional ports and associated paths 15, 16 each having a bandwidth sufficient to transmit video data at video display rates. Again, it should be noted that during preview there is no alteration to the video data stored in the video store 11 and this frees the user to experiment with different edits before mixing a commitment to a particular combination of clips.

The system 10 also includes the facility to key together simultaneously several clips on a frame by frame basis. In the exemplary system described herein this keying facility is selected by moving the reel bar 35 to the right in FIG. 4 thereby widening the working area 31 defined between reel bars 34 and 35. Video clips 37, 38, 39, 40 are each selected by use of the cursor and by manipulation of the stylus on the touch tablet as previously described. Selected clips are each brought into the working area 31 by further movement of the stylus and each new clip may be placed in front, behind, or between clips already displayed in the working area 31. The clips 37 to 40 together form a stack and the position of each clip 37 to 40 determines the rank or priority of the clip in the stack. Each clip 37 to 40 can be manipulated independently or in combination with other clips in the stack. Thus, for example, clip 38 can be taken out of the stack by attaching the cursor 57 to the clip and moving it to working area 32. The clip can then be replicated or otherwise modified before being returned to its original position or another position in the stack. A clip can also be scrolled independently of other clips in the stack. Clips are connected to the cursor and moved sideways in the working area 31 until, for example, clip 38 does not overlap and is not overlapped by any of the other clips. Clip 38 can then be scrolled independently, as described hereinabove.

The system is arranged such that a group of coincident frames, corresponding ones from each of the clips in the stack, is available in the display store 22 so that the composite result can be displayed on the monitor. This enables the user to preview the result before the clips are finally combined and committed to the video store 11, and to make corrections to individual clips so that the composite clip contains the desire result. For example, the colour correction in one clip can be adjusted so as to match the coloration in another of the clips while both clips or frames from both clips are displayed simultaneously. If desired one foreground clip, e.g. clip 27, can be viewed against the background clip, e.g. clip 40.

The video processor 27 includes a keyer circuit (not shown) by which a blue screen key can be generated. Such a keyer circuit is disclosed in U.S. Pat. No. 4,667,221, the teachings of which are incorporated herein by reference. A user defined key or stencil may also be created by the graphics processor 29 on a frame-by-frame basis for some or all frames in a selected clip. One way in which the user can create a stencil will be described in greater detail hereinafter with reference to FIG. 5 of the accompanying drawings. Previously defined key clips can be associated with respective video clips. The display store 22 is arranged to add data representing a black back-shadow to video clip data for which there is an associated key clip as the clip data is written to the display store 22. The black backshadow (not shown) facilitates identification of a keyed clip when frames of the clip are displayed on the monitor 25.

When a stack is defined in the working area 31 the key clips associated with the respective video clips are assigned a priority or rank such that when the clips 37 to 40 are combined, keyed features in clip 37 are seen in the foreground obscuring features in the other clips 38 to 40, keyed features in clip 38 not obscured by keyed features in clip 37 are seen obscuring features in clips 39 and 40, keyed features in clip 39 not obscured by keyed features in clips 37 and 38 are seen obscuring features in clip 40, and features in the clip 40 form the background which is obscured by keyed features in the other clips 37 to 39.

It should be noted that data relating to any clip displayed on the monitor can be transferred to the effects processor 28 and/or the graphics processor 29 for creation of a key, or indeed for modification by any of the other operations provided by the two processors 28, 29.

Figure 5:
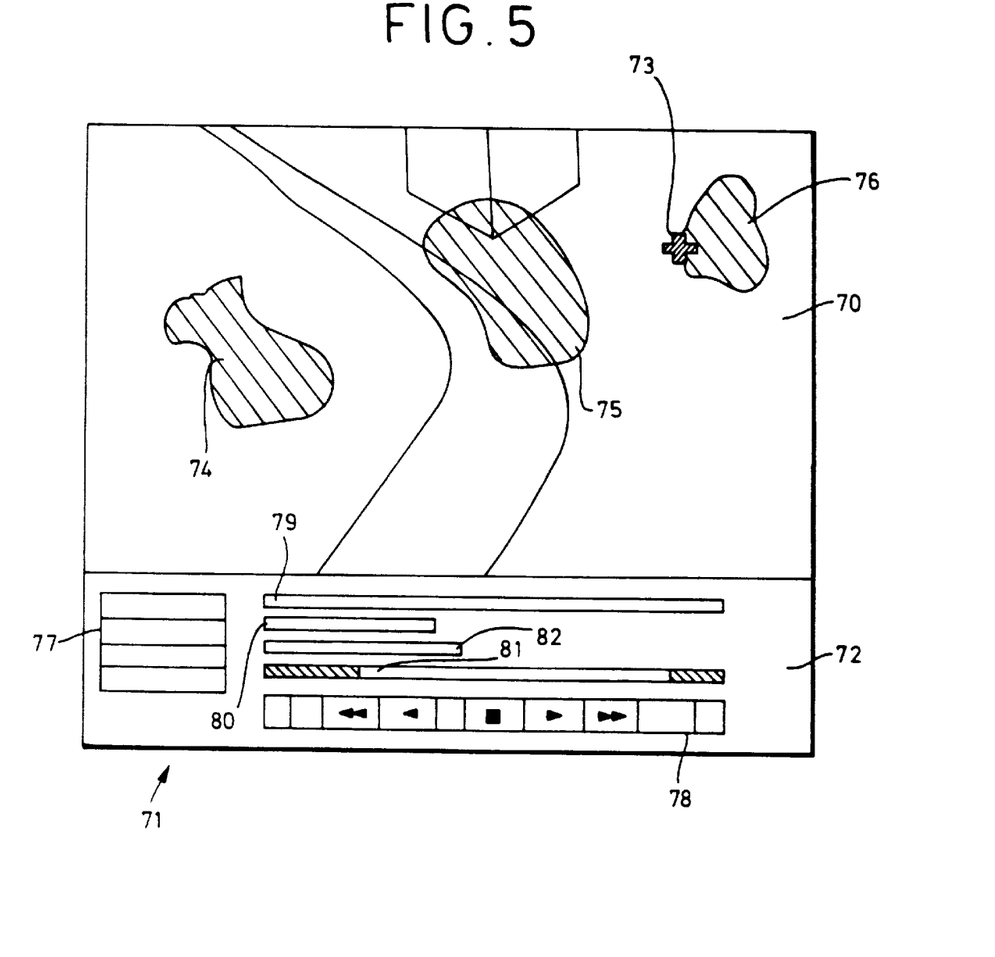
FIG. 5 is an exemplary display of the system in a stencil creating mode.

As mentioned hereinbefore, the system can be configured to operate in a stencil creating mode in which the user is able to create a control image or stencil clip on a frame-by-frame basis. In this mode of operation, the display store 22 is arranged to generate a display on the monitor 25, such as that shown in FIG. 5 of the accompanying drawings, to facilitate user creation of a control image clip. With the system configured in the stencil creating mode data for the first frame in the video clip, for which a stencil is to be created, is written into the display store 22 for display of the video frame on the monitor 25. As shown in FIG. 5, the first video frame comprises an image 70 of arbitrary content and is displayed on the screen 71 in a display area and a menu is displayed in a control area 72. A cursor 73 is also displayed on the screen 71 and can be moved freely in both the image display area 70 and the control area 72.

At the same time as the video frame data is written to the display store 22 an area therein is designated for storing data representing the control image. Initially, the stored control image data represents a transparent image since no image has been created by the user or under his control. The processor in the display store is arranged to combine the video frame data and the control image data on a pixel-by-pixel basis and to output the combined image for display on the monitor 25. Since the initial stored image data corresponds to a transparent image, when the combined image is first displayed all that is shown is the image of the video frame.

With the cursor 73 disposed in the image 70, manipulation of the stylus and touch tablet device 30 will cause the graphics processor 29 to create control image data in the manner described in aforementioned patents GB 2,089,625 and U.S. Pat. No. 4,514,818. Unlike the video image, which is a full colour image usually represented by 24-bit data in RGB (Red, Green, Blue) colour format, the control image is a single colour image represented by 8-bit data. The control image data and the video image data in the display store are combined such that the control image appears as a partially transparent colour, say red, overlaying the video image. In FIG. 5 the areas 74 to 76 represent control image areas drawn by a user by manipulation of the stylus and touch tablet device 30. It should be noted that features in the image 70 remain visible through the control image areas 74 to 76 in order to facilitate creation of the control image.

This approach of partially transparent overlaying of the control image on the video image during control image creation is in itself well known. However, hitherto known systems have been arranged such that the transfer of control image and video image data about the system requires a relatively large number of user input commands.

The present system is arranged such that control image data and video image data are associated with each other during the storing and moving of data around the system. Furthermore, all of the frames in each of the video image clips are associated with each other so as to facilitate storage and retrieval of consecutive frames in a clip. Thus, for example, once the user has completed the creation of a control image for a first video image frame, the video image data and the control image data are written to the video store 11 and the video image data for the next video image frame is automatically written from the video store 11 to the display store 22 for the creation of a corresponding control image. The user causes this to happen by selecting by use of the cursor 73 the appropriate command from a first set of command boxes 77 displayed in the menu area 72.

Once the user has created a control image for each frame of video, or indeed at any other time during the creation of control images, the user may preview the video clip and the control image clip running together at video rate or at a lesser rate. This previewing of video and control image clips is controlled by the selection of commands from a second set of command boxes 78 in the menu area 72 by the cursor 73.

Video clips contain twenty five or thirty image frames (depending on the format adopted) for every one second of display. Thus, even just a few seconds of video will contain many different frames and in order to help the user to identify the position of a displayed frame in a clip the menu area is further provided with two pairs of position indicator bars 79, 80 and 81, 82. The indicator bar 79 is of fixed length and represents the whole of the video clip currently being worked upon. The indicator bar 80 varies in length and thereby represents the position of the current frame in the clip, i.e. the frame being worked upon. The indicator bar 81 is of fixed length and represents clips available in the video store for creating an associated control image. The indicator bar 82 varies in length to indicate the clip from the available clips currently being worked upon and the position of the current frame in the clip.

The user may wish to return to a previously created control image and to make modifications thereto. The control image clip to be modified will have been created at some earlier stage by any one of several different approaches including the aforementioned user of a keyer circuit and the previously described drawing by manipulation of the stylus and touch tablet device 30. As the user scans through a clip using the command boxes 78 in the menu area, data for both the video clip and the control image clip are transferred on a frame-by-frame basis from the video store 11 to the display store 22 for display on the monitor 25. The user can select a frame by stopping the displayed clip at the desired frame and when this is done the data for the video frame and the corresponding control image frame remain stored in the display store so that the combined video frame and control image frame are displayed on the monitor 25.

Once the user has effected the desired modification or modifications to the control image, the data for the modified control image is written to the video store to be stored as a new control image therein. The initial control image data (old control image data) is not replaced in the video store 11 but is instead re-indexed as old control image data. In the event that the user later decides to modify further the control image, the new control image data is written from the video store to the display store. Following modification, the new control image data is written to the video store and the data previously written from the video store is discarded. In this way, the video store 11 is arranged to maintain the initial control clip data in unaltered form and to store only the data for the latest version of the control image. A similar technique of data transfer is also applied to video frame data written to the display store for retouching or other processing and thus the video store will contain the initial video clip data and data representing the latest version of any frames in the clip that have been modified.

If a new clip is selected for preview as above described the data representing the new clip is compiled from new frame data for frames that have been modified and old frame data for frames in the new clip which have not been modified. This applies to the video image and the control image both separately and together.

The ability to transfer both a video frame and its corresponding control image frame facilitates rotoscope-type operations. In a conventional rotoscope an image frame is projected onto a screen and an insert for the image is drawn onto acetate film. This process is repeated on a frame-by-frame basis with the insert for each frame being drawn onto a different acetate film. In this way a set of acetate films is built up and one complete the set is taken away for further processing elsewhere to combine the inserts with the image frames. In the above described mode of operation the creation of a control image for each video frame is the electronic equivalent to the drawing of an insert onto an acetate film. The rotoscope-type operations performed by the system are easier than conventional rotoscoping because the control image is automatically associated with the corresponding video image and is immediately available for drawing of the control image whenever a video frame is read from the video store. Furthermore, since the system provides for rotoscope-type operations in an electronic environment there is no danger of the control images being put in the wrong order, or being damaged or destroyed, and the control images can be readily modified if desired.

Once the user is satisfied with the result of his editing, whether it be a simple cut and insert, a dissolve or a layered sequence of stacked clips with colour and texture changes to some of the clips therein, the resulting clip can be committed to memory. Clip data is read from the video store 11 and combined frame by frame by the processors 27, 28 and 29 as appropriate before being written back to the video store 11.

In the case of a simple cut and insert splice edit there is no combining as such to be performed by the processors 27 to 29 and so the operation is simply one of re-indexing the frame data held in the store 11. In the case of a dissolve edit it is necessary to combine two frames from different clips and so data for the two clips is read a frame at a time from the store 11 by outputting by way of one or the ports, e.g. path 15, and the resulting combined frame data is written back to the store by way of the other of the ports, e.g. port 16. It will be appreciated that since each path only has sufficient bandwidth for one video channel the reading of frames for both clips via only port 15 will effectively halve the rate at which the two clips are read from the store 11. However, this halving of the reading rate is unimportant since the combining operation corresponds to a final commitment by the user and can be performed without being displayed on the monitor 25. There will be a similar or greater reduction in speed when plural clips of a stack as abovedescribed are combined but again this reduction is unimportant to the working of the system.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as defined in the appended claims and equivalents thereof.

For example, the four relatively high capacity disc drives in the video store could be replaced by a large number of smaller disc drives. An important consideration in the construction of the video store is that it should have sufficient bandwidth for at least two video clips, and more than two if so desired, to be transferred each at video rate. By increasing the number of disc drives comprising the store 11 the complexity of transferring data will increase also. Random access to the frames stored in the discs can nevertheless be maintained by enlarging the cache stores in the buffers and/or the converter, the size of the cache stores depending on the excess bandwidth and seek time of the discs, and on the number of clips to be transferred simultaneously at video rate. The video store may be used in a high definition television system simply by increasing the number of discs used and if necessary enlarging the cache stores.

What is claimed is:

1. An electronic video store comprising:
   at least one disc storing unit for storing digital video data representing a multiplicity of video frames;
   an access circuit connected to said storing unit for providing random access input to and output from said storing unit of video frames; and
   two ports connected to the access circuit and each capable, independently or simultaneously with the other, of transferring by way of said access circuit to or from said storing unit a video frame at video rate.

2. A store as claimed in claim 1, wherein said at least one storing unit comprises at least two separate storing units each connected to the said two ports via the access circuit and data representing each video frame is distributed between the storing units.

3. A store as claimed in claim 2, wherein each of said at least two storing units comprises at least two disc drives which together are capable of transferring video data at video rate.

4. A store as claimed in claim 3, wherein each frame comprises two interleaved fields, and the access circuit is arranged for transfer of data stored or to be stored in the storing units and arranged therein such that each video frame data representing one field is stored in one storing unit and data representing the other field is stored in the other storing unit.

5. A store as claimed in claim 4, wherein the access circuit is arranged for transfer of data to or from each said storing unit, said data being arranged such that each field is divided into chrominance and luminance data groups which are stored respectively in the disc drive of the storing unit.

6. A store as claimed in claim 2, wherein the access circuit comprises two buffers respectively associated with the two storing units for buffering data in transfer between each of the storing units and the two ports.

7. A store as claimed in claim 6, wherein the two buffers each comprise a cache store for accumulating a multiplicity of frames of data to facilitate the transfer of data between the two ports and the storing units.

8. A video processing apparatus comprising:
   at least one storing unit for storing digital video data representing a multiplicity of video frames;
   an access circuit connected to said storing unit for providing random access input to and output from said storing unit of video frames;
   two ports connected to the access circuit and each capable, independently or simultaneously with the other, of transferring by way of said access circuit to or from said storing unit a video frame at video rate;
   a frame store for storing data representing at least one video frame and corresponding control image;
   a user operable input device; and
   a processor responsive to the user operable input device, the processor comprising a selecting circuit for selecting at least one initial video frame and corresponding initial control image to be processed and for writing data representing the selected at least one video frame and corresponding control image to the frame store, a circuit for processing control image data in the frame store to produce data representing a modified control image for producing further identifying data which enables the modified control image to be uniquely identified and indicates that the modified control image is associated with the selected at least one initial video frame and corresponding control image, and a writing circuit for writing the thus produced modified control image data to the storing unit for storage therein in association with the selected at least one initial video frame and corresponding control image.

9. An apparatus as claimed in claim 8, wherein the at least one storing unit comprises a bulk store for storing the video clip, the bulk store being arranged so that data for the multiplicity of video frames and corresponding control image can be accessed in a frame random access order.

10. An apparatus as claimed in claim 9, which further comprises storing the identifying data and the further identifying data in a data store.

11. An apparatus as claimed in claim 9, further comprising displaying an image representing both the video frame and the control image data in the frame store on a monitor.

12. An apparatus as claimed in claim 8, wherein the at least one storing unit comprises a data store for storing the identifying data and the further identifying data.

13. An apparatus as claimed in claim 8, further comprising a monitor for displaying an image representing both the at least one video frame and the corresponding control image data in the frame store.

14. An apparatus as claimed in claim 8, wherein the processor comprises a circuit for generating data representing a control menu for display on a portion of a monitor, the control menu including a first indicator bar having an associated first indicator for indicating the position in the clip of the at least one storing unit, a frame of whose data together with corresponding control data has been written to the frame store.

15. An apparatus as claimed in claim 14, wherein the menu includes a second indicator bar comprising a plurality of portions each representing a respective video clip stored in the at least one storing unit including the video clip containing the video frame whose data is stored in the frame store, the second bar having an associated second indicator for indicating the position in the video clip of the frame whose data is stored in the frame store.

16. An apparatus as claimed in claim 8, wherein the control image comprises a monochrome image derived from one or more user selected features of the corresponding initial video frame.

17. An apparatus as claimed in claim 16, wherein the user selected features are selected by identifying a characteristic of the image.

18. An apparatus as claimed in claim 16, wherein the user selected features are selected by identifying areas of the image.

19. An electronic video store method comprising steps of:

storing digital video data representing a multiplicity of video frames in at least one storing unit;

providing an access circuit connected to said storing circuit for providing random access input to and output from said storing unit of video frames; and providing two ports connected to the access circuit and each capable, independently of simultaneously with the other, transferring by way of said access circuit to or from said storing unit a video frame at video rate.

20. A video processing method comprising steps of:

storing digital video data representing a multiplicity of video frames in at least one store unit;

providing an access circuit connected to said storing unit for providing random access input to and output from said storing unit of video frames;

providing two ports connected to the access circuit and each capable, independently or simultaneously with the other, of transferring by way of said access circuit to or from said storing unit a video frame at video rate;

storing in a frame store data representing at least one video frame and corresponding control image; and providing a processor responsive to user input, the processor comprising a selecting circuit for selecting at least one initial video frame and corresponding initial control image to be processed and for writing data representing the selected at least one video frame and corresponding control image to the frame store, a circuit for processing control image data in the frame store to produce data representing a modified control image and for producing further identifying data which enables the modified control image to be uniquely identified and indicates that the modified control image is associated with the selected at least one initial video frame and corresponding control image, and a writing circuit for writing the thus produced modified control image data to the storing unit for storage therein in association with the selected at least one initial video frame and corresponding control image.

* * * * *

UNITED STATES PATENT AND TRADEMARK OFFICE
CERTIFICATE OF CORRECTION

PATENT NO. : 6,144,391
DATED : November 7, 2000
INVENTOR(S) : Neil Roy Hinson, et al.

Page 1 of 1

It is certified that error appears in the above-identified patent and that said Letters Patent is hereby corrected as shown below:

<u>Title Page,</u>
Please change item [63] from "Continuation of application No. 08/467,755, June 6, 1995, Pat. No. 5,808,628" to -- Continuation of application No. 08/467,755, June 6, 1995, Pat. No. 5,808,628, which is a continuation of application No. 08/030,823, March 12, 1993, now abandoned --; and
please add item -- [30]  Foreign Application Priority Data
Mar. 13, 1992   [GB]   Great Britain...................9205503.7 --.

Signed and Sealed this

Ninth Day of October, 2001

*Attest:*

NICHOLAS P. GODICI
*Attesting Officer*   *Acting Director of the United States Patent and Trademark Office*